(12) United States Patent
Halmos et al.

(10) Patent No.: US 8,947,647 B2
(45) Date of Patent: Feb. 3, 2015

(54) RANGE-RESOLVED VIBRATION USING LARGE TIME-BANDWIDTH PRODUCT LADAR WAVEFORMS

(75) Inventors: Maurice J. Halmos, Encino, CA (US); Jean-Paul Bulot, El Segundo, CA (US); Matthew J. Klotz, Pasadena, CA (US)

(73) Assignee: Raytheon Company, Waltham, MA (US)

( * ) Notice: Subject to any disclaimer, the term of this patent is extended or adjusted under 35 U.S.C. 154(b) by 226 days.

(21) Appl. No.: 13/324,162

(22) Filed: Dec. 13, 2011

(65) Prior Publication Data
US 2013/0148103 A1    Jun. 13, 2013

(51) Int. Cl.
*G01C 3/08* (2006.01)
(52) U.S. Cl.
USPC .......... 356/5.09; 356/4.01; 356/5.01; 356/28; 356/28.5
(58) Field of Classification Search
USPC .............. 356/28, 28.5, 5.01–5.15, 3.01–3.16, 356/4.01–4.1
See application file for complete search history.

(56) References Cited

U.S. PATENT DOCUMENTS

| | | | |
|---|---|---|---|
| 3,790,278 A | 2/1974 | Buczek et al. | |
| 4,743,110 A | 5/1988 | Arnaud et al. | |
| 4,959,800 A | 9/1990 | Woolley | |
| 4,968,968 A | 11/1990 | Taylor | |
| 5,289,252 A | 2/1994 | Nourrcier | |
| 5,398,130 A | 3/1995 | Redman | |
| 5,623,267 A | 4/1997 | Wurman | |
| 5,847,816 A | 12/1998 | Zediker et al. | |
| 6,259,803 B1 * | 7/2001 | Wirtz et al. | 382/103 |
| 6,388,739 B1 | 5/2002 | Rice | |
| 6,545,785 B1 | 4/2003 | Heflinger et al. | |
| 6,559,932 B1 | 5/2003 | Halmos | |
| 6,614,386 B1 | 9/2003 | Moore et al. | |
| 6,823,033 B2 | 11/2004 | Fahim | |
| 6,875,978 B2 * | 4/2005 | Halmos | 250/227.11 |
| 6,885,299 B2 | 4/2005 | Cooper et al. | |
| 7,239,777 B1 | 7/2007 | Christensen et al. | |
| 7,345,744 B2 | 3/2008 | Halmos et al. | |
| 7,414,706 B2 * | 8/2008 | Nichols et al. | 356/5.07 |

(Continued)

FOREIGN PATENT DOCUMENTS

| | | |
|---|---|---|
| EP | 1 542 036 | 6/2005 |
| FR | 2 519 771 | 7/1983 |

(Continued)

OTHER PUBLICATIONS

Kachelmyer et al. 'Laser Vibration Sensing', Nov. 1, 1995, vol. 8, The Lincoln laboratory Journal.*

(Continued)

*Primary Examiner* — Luke Ratcliffe
*Assistant Examiner* — Assres H Woldemaryam
(74) *Attorney, Agent, or Firm* — Daly, Crowley, Mofford & Durkee, LLP

(57) ABSTRACT

In one aspect, a method includes forming range bins from range compressed data, the range compressed data comprising a train of coherent pulses formed based on a transmitted signal from a laser detection and ranging (LADAR) sensor and having a large time-bandwidth product and for each range bin, compensating for motion of the LADAR sensor, performing a Fourier transform on the compressed range data, determining a centroid of individual velocity measurements and performing Fourier transform of the centroid to determine a vibration.

19 Claims, 8 Drawing Sheets

(56) References Cited

U.S. PATENT DOCUMENTS

| | | | |
|---|---|---|---|
| 7,495,994 | B2 | 2/2009 | Makris et al. |
| 7,505,488 | B2 | 3/2009 | Halmos |
| 7,545,312 | B2 | 6/2009 | Kiang et al. |
| 7,684,957 | B2 | 3/2010 | Ueno |
| 7,805,082 | B1 | 9/2010 | Whiteaway |
| 7,961,332 | B2 | 6/2011 | Kilpatrick et al. |
| 7,986,397 | B1 | 7/2011 | Tiemann et al. |
| 8,487,808 | B2 * | 7/2013 | Boufounos et al. ......... 342/25 R |
| 2003/0011780 | A1 | 1/2003 | Dalhoff |
| 2003/0030882 | A1 | 2/2003 | Garrett et al. |
| 2003/0075677 | A1 * | 4/2003 | Halmos ................. 250/227.23 |
| 2005/0051713 | A1 * | 3/2005 | Halmos ................. 250/227.11 |
| 2005/0099634 | A1 | 5/2005 | Dubois et al. |
| 2005/0237533 | A1 | 10/2005 | Lal et al. |
| 2006/0061753 | A1 | 3/2006 | Harris et al. |
| 2006/0079773 | A1 | 4/2006 | Mourad et al. |
| 2006/0202885 | A1 | 9/2006 | Chen |
| 2007/0166049 | A1 | 7/2007 | Pearson et al. |
| 2009/0237292 | A1 * | 9/2009 | Tigrek et al. ................. 342/109 |
| 2009/0304393 | A1 | 12/2009 | Kawanishi et al. |
| 2010/0014567 | A1 | 1/2010 | Yamamoto |
| 2010/0102203 | A1 * | 4/2010 | Grund ........................ 250/207 |
| 2011/0299849 | A1 | 12/2011 | Klotz et al. |
| 2013/0104661 | A1 | 5/2013 | Klotz et al. |
| 2013/0148095 | A1 | 6/2013 | Coda et al. |
| 2013/0148103 | A1 | 6/2013 | Halmos et al. |
| 2013/0188167 | A1 | 7/2013 | Halmos et al. |

FOREIGN PATENT DOCUMENTS

| | | |
|---|---|---|
| FR | 2519771 | 7/1983 |
| JP | 2000/065923 | 3/2000 |
| JP | 2004/309367 | 11/2004 |
| JP | 2006/329829 | 12/2006 |
| WO | WO 95/15503 | 6/1995 |
| WO | WO 2004/034530 | 4/2004 |
| WO | WO 2010 086044 | 8/2010 |

OTHER PUBLICATIONS

A. Kachelmyer, 'Inverse Synthetic aperture radar (ISAR) image processing', SPIE vol. 1633 Laser Radar VII (1992)/193.*
A.L. Kachelmyer, Range-Doppler Imaging: Waveforms and Receiver Design, Massachusetts Institute of Technology, Lincoln Laboratory, Lexington, Massachusetts, 1988, SPIE vol. 999 Laser Reader III, pp. 138-161.
EP Search Report for Application No. 12160148.8-220 dated Feb. 1, 2013, 8 pages.
Kachelmyer et al.; "Laser Vibration Sensing", The Lincoln Laboratory Journal, vol. 8, No. 1, Jan. 1, 1995, 26 pages, XP55041316, ISSN: 0896-4130.
Kechelmyer "Inverse Synthetic Aperture Radar (ISAR) Image Processing", Proceedings of SPIE, Jun. 1, 1992, pp. 193-205, XP55041385, ISSN: 0277-786X, DOI: 10.1117/12.59222.
Sturm et al.; "A Technique for Removing Platform Vibration Noise from a Pulsed Ladar Vibration Sensor", Optics and Laser Technology, Elsevier Science Publishers BV., Amsterdam, NL, vol. 27, No. 5, Oct. 1, 1995, pp. 343-350, XP004026187, ISSN: 0030-3992, DOI: 10.1016/0030-3992(95)98695-0.
A.L. Kachelmyer, "Spectrogram Processing of Laser Vibration Data," SPIE vol. 1936 Applied Laser Radar Technology (1993), p. 78-89.
Matthew P. Dierking and Bradley D. Duncan, "Periodic, pseudonoise waveforms for multifunction coherent ladar," Applied Optics, vol. 49, No. 10, Apr. 1, 2010, p. 1908-1922.

Monica L. Minden et al., "A Range-Resolved Doppler Imaging Sensor Based on Fiber Lasers," IEEE Journal of Selected Topics in Quantum Electronics, vol. 3, No. 4, Aug. 1997, p. 1080-1086.
Patent Application filed on Jan. 13, 2011, entitled: Doppler Compensation for a Coherent Ladar, Coda et al., 21 pages.
Response to Office Action from Foreign Associate dated Dec. 19, 2013, for EP Application No. 12159971.6-1811, filed on Mar. 16, 2012, 4 pgs.
European Search Report dated Apr. 17, 2013, for EP Appl. No. 12/182,615, 6 pgs.
Office Action dated Dec. 6, 2013 for U.S. Appl. No. 13/285,821, filed on Oct. 31, 2011, 25 pgs.
The American Heritage Dictionary of the English Language, Fourth Edition. 2000. Houghton Mifflin Company. Updated in 2009. "The Free Dictionary: deterministic", http://thefreedictionary.com/deterministic.
Office Action dated Nov. 27, 2013 for U.S. Appl. No. 13/324,155, filed on Dec. 13, 2011, 11 pages.
Non-Final Office Action dated Nov. 13, 2013 for U.S. Appl. No. 13/706,746, 13 pgs.
Response to Office Action from Foreign Associate dated Dec. 27, 2013, for EP Application No. 12161856.5-1811, filed on Mar. 28, 2012, 12 pgs.
Response filed by Foreign Associate dated Dec. 18, 2013 for EP Appl. No. 12160148.8, 13 pgs.
U.S. Appl. No. 13/353,854, filed Jan. 9, 2012, Halmos.
U.S. Appl. No. 13/324,162, filed Dec. 13, 2011, Halmos, et al.
U.S. Appl. No. 13/324,155, filed Dec. 13, 2011, Coda, et al.
Response to Office in European Patent No. 12182615.0 filed on Jul. 17, 2013 12 pages.
Ling, H. "Exploitation of Microdoppler and Multiple Scattering Phenomena for Radar Target Recognition," Office of Naval Research, Research Grant N00014-03-1-0021 Oct. 1, 2002 through May 31, 2006 (Aug. 24, 2006).
Schneider, Richard; Peter Thurmel; Michael Stockmann, "Distance Measurment of Moving Objects by Frequency Modulated Laser Radar." Opt. Eng. 40(1), 33-37 (Jan. 7, 2001).
U.S. Appl. No. 13/324,162, filed Jan. 13, 2011; entitled: Range-Resolved Vibration Using Large Time-Bandwidth Product Ladar Waveforms, Halmos et al. 27 pages.
U.S. Appl. No. 13/324,162, filed Jan. 13, 2011, entitled Doppler Compensation For a Coherent Ladar, Coda et al., 21 pages.
Extended European Search Report dated Feb. 22, 2013; for EP Appl. No. 12159971.
Notification of Transmittal of The International Search Report & The Written Opinion of the ISA (including the ISR & WO of the International Searching Authority), dated Jan. 20, 2014 for Interantional Appl. No. PCT/US2013/062524, 15 pages.
Magee et al., "Bistatic Coherent Laser Radar Performance", Geoscience and Remote Sensing Sumposium Proceedings, Jul. 1998, 3 pages.
Ostermeyer et al., "0.5 J Frequency Stabilized Diode Pumped Solid State Laser for a Next Generation Lidar System", Lasers and Electro-Optics, Conference in San Francisco, CA, May 16, 2004, 2 pages.
Welsh, et al., Bistatic Imaging lidar Technique for Upper Atmospheric Studies, Jan. 1998, Applied Optics, vol. 28, issue 1, pp. 82-88.
Whiteman, et al., Raman Airborne Spectroscopic Lidar (RASL) Final Report, Sep. 2002, NASA pub.
Extended European Search Report dated Dec. 28, 2012 for EP Application No. 12161856.5-1248 43 pages.
Office Action from Foreign Associate dated Aug. 13, 2013; for EP Application No. 12161856.5-1811 filed Jul. 27, 2013 4 pages.
Office Action from Foreign Associate dated Jul. 2, 2013; for EP Application No. 12159971.6-1811 filed Jun. 24, 2013 4 pages.

* cited by examiner

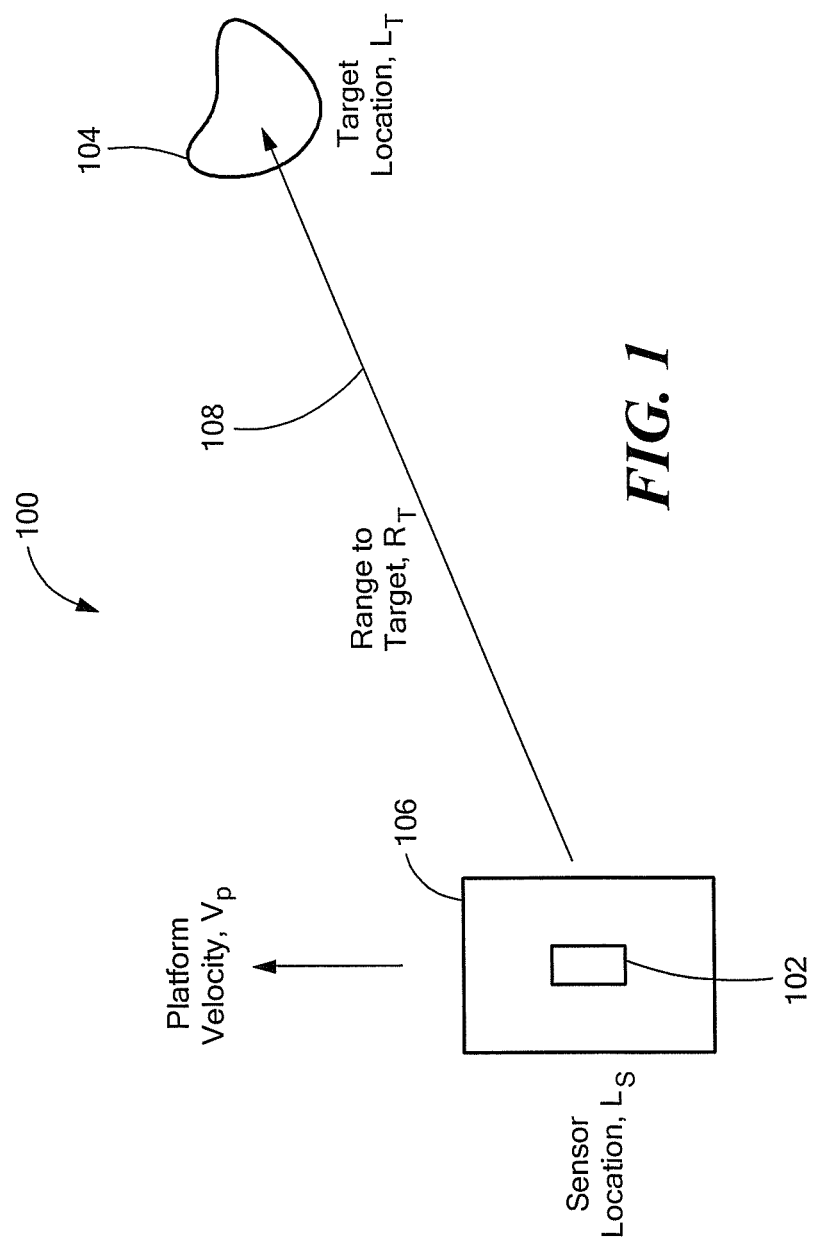

FIG. 5

RANGE-RESOLVED VIBRATION USING LARGE TIME-BANDWIDTH PRODUCT LADAR WAVEFORMS

BACKGROUND

A laser detection and ranging (LADAR) sensor, sometimes referred to as laser radar, uses laser beams to measure distances (or ranges) and instantaneous velocities. The LADAR sensor can be used to form images of scenes with a high degree of definition (e.g., 15 cm or better resolution at ranges greater 1,000 meters). LADARs may be mounted on stationary objects and on vehicles such as airplanes, for example.

SUMMARY

In one aspect, a method includes forming range bins from range compressed data, the range compressed data comprising a train of coherent pulses formed based on a transmitted signal from a laser detection and ranging (LADAR) sensor and having a large time-bandwidth product and for each range bin, compensating for motion of the LADAR sensor, performing a Fourier transform on the compressed range data, determining a centroid of individual velocity measurements and performing a Fourier transform of the centroid to determine a vibration.

In another aspect, an article includes a non-transitory machine-readable medium that stores executable instructions. The instructions cause a machine to form range bins from range compressed data, the range compressed data comprising a train of coherent pulses formed based on a transmitted signal from a laser detection and ranging (LADAR) sensor and having a large time-bandwidth product and for each range bin, compensate for motion of the LADAR sensor; perform a Fourier transform on the range compressed data; determine a centroid of individual velocity measurements; and perform a Fourier transform of the centroid to determine a vibration.

In a further aspect, an apparatus includes circuitry to form range bins from range compressed data, the range compressed data comprising a train of coherent pulses formed based on a transmitted signal from a laser detection and ranging (LADAR) sensor and having a large time-bandwidth product; compensate for motion of the LADAR sensor for each range bin; perform a Fourier transform on the range compressed data for each range bin; determine a centroid of individual velocity measurements for each range bin; and perform a Fourier transform of the centroid to determine a vibration for each range bin.

DESCRIPTION OF THE DRAWINGS

FIG. 1 is a block diagram of a laser detection and ranging (LADAR) environment.

FIG. 5 is a diagram of the time samples organized into respective range bins.

DETAILED DESCRIPTION

Figure 2A:
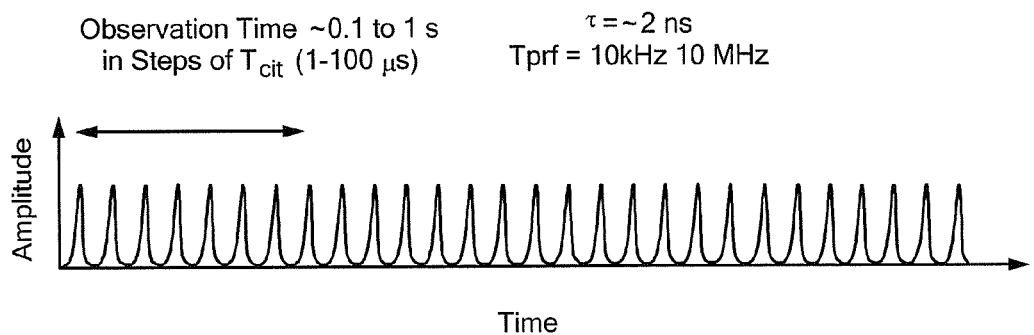
FIG. 2A is a graph of amplitude versus time of a pulse waveform.

Described herein is an approach to use laser range-resolved vibration imaging. Laser range resolved vibration imaging is the ability to create a three-dimensional (3-D) image (angle-angle-range resolution) where for each resolved element, a vibration spectrum, which is the representation of the target vibration signal in the frequency domain, is also obtained. In one example, laser range-resolved vibration imaging may be used to isolate the vibration signature of a target, which is a unique frequency decomposition of the vibration tones of the target's surface, while ignoring clutter (noise) from surroundings of the target that may be also in a line of sight between a laser detection and ranging (LADAR) sensor and the target. For instance, one could measure the vibration signature of a vehicle that is partially covered by a tree canopy, without having to mix in the vibration motion of the leaves and branches that are in the way. In another example, laser range resolved vibration imaging may be used to separate the various vibrations that may exist across an extended body, such as an airframe, where the nose, the middle, and the tail may have different vibration characteristics.

In particular, the techniques described herein uses spectrograms and a large time-bandwidth waveform to yield range information combined with high fidelity Doppler information. By carefully combining these two techniques, a vibration measurement, that requires relatively long observation time, can be combined with a range resolution measurement, yielding range-resolved vibration imaging. The large time-bandwidth waveform may be a train of coherent short pulses (e.g., a mode-locked laser) or a continuous wave (CW) train of linear (or non-linear) frequency modulation (FM) chirp waveforms, random frequency shift keying waveforms, and random phase shift keying waveforms and so forth, which can be used for the range-resolved vibration imaging.

Referring to FIG. 1, a LADAR environment 100 includes a LADAR sensor 102 at a location, $L_S$, to detect a target 104 at a location, $L_T$ with a range to target, $R_T$. The range to target, $R_T$, is a length of a vector 108 pointing from the LADAR sensor 102 to the target 104. The LADAR sensor 102 is disposed on a sensor platform 106 (e.g., a vehicle such as a helicopter) traveling at a velocity, $V_P$.

The LADAR sensor 102 transmits a signal (waveform) and the signal reflects off the target back to the LADAR sensor 102. Typically the received signal is the same waveform as the transmitted signal but shifted in time and frequency (Doppler).

In order to measure a vibration spectrum from a target, a series of precise instantaneous velocity or Doppler measurements are made. Each of these Doppler measurements will required a relatively large coherent integration time to make the measurement as precise as possible. A coherent integration time, $T_{cit}$, can be anywhere from 1 microsecond to 10 millisecond, depending on the speed of the target motion and the vibration high frequency end (e.g., the maximum coherent time must be smaller than $1/(2*f_{max})$, where $f_{max}$ is the maximum vibration frequency). On the other hand, in order to have reasonable range resolution (e.g., on the order of 15 cm), time precision in the neighborhood of 1 ns or less is required, which translates into a bandwidth, BW, of ~1 GHz. Using this bandwidth, and a typical coherent time of 20 μs, the time bandwidth product, BT, of such a waveform would be:

$$BT = T_{cit} \times BW = 20 \text{ μs} \times 1 \text{ GHz} = 20,000,$$

which, if greater than 100, would be considered a large time-bandwidth product waveform.

Figure 2B:
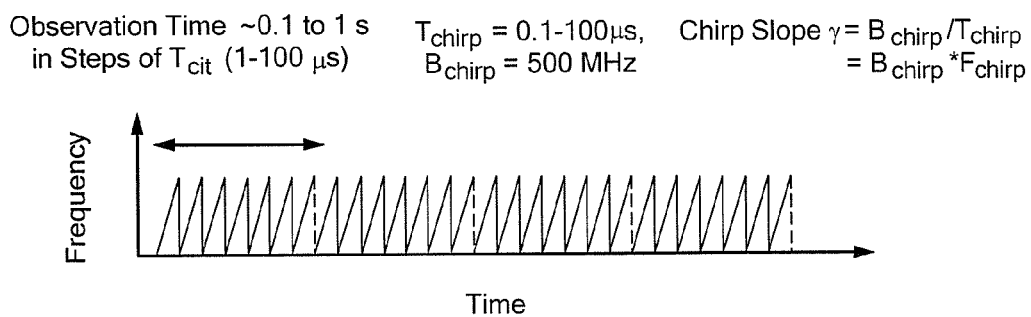
FIG. 2B is a graph of frequency versus time of a linear frequency modulation (LFM) chirp waveform.

Referring to FIGS. 2A and 2B, there are multiple ways of achieving a large BT product waveform. In particular, the large BT product waveform includes a train of coherent subsignals (patterns). In one example, as shown in FIG. 2A, a train of coherent pulses may be used. The bandwidth is achieved in the coherent pulse case by having the individual pulsewidths be about 1/BW. In FIG. 2A, the bandwidth, BW, for 2 ns is 500 MHz and the coherent processing time is set to 25 microseconds, Tcit. In this case the pulse spacing was set to a 20 nanoseconds period yielding a 50 KHz pulse repetition rate (PRF).

In another equivalent example, as shown in FIG. 2B, a train of a train of coherent linear frequency modulation (LFM) chirps may be used. The bandwidth is achieved in the chirp case, by sweeping the bandwidth at each individual chirp. In the example depicted in FIG. 2B, the bandwidth is also set to 500 MHz and the coherent processing time to 25 microseconds, $T_{cit}$. Each chirp has a period, $T_{chirp}$, of 20 ns yielding also a repetition rate of 50 KHz.

Figure 3A:
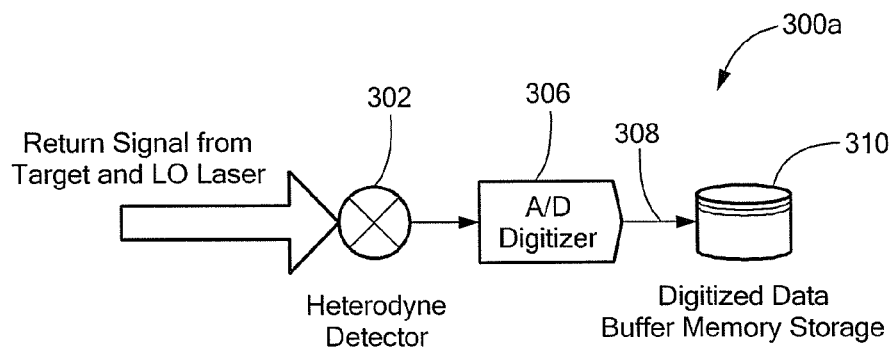
FIG. 3A is a flow diagram of an example of the receiver hardware used to collect and digitize the return signal.
Figure 3B:
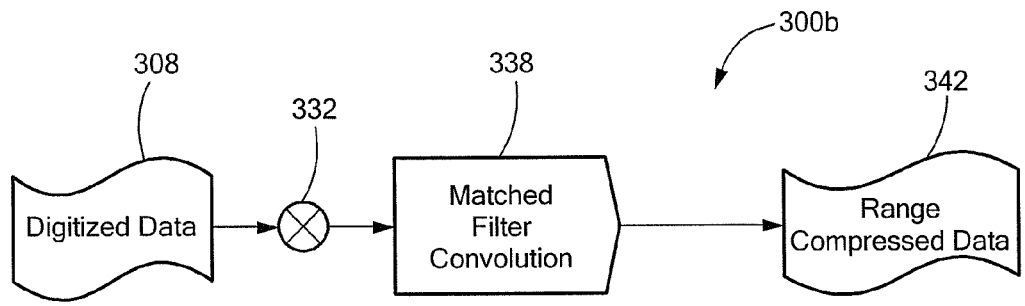
FIG. 3B is a flow diagram of an example of a first portion of process to determine the range and vibration compressed data.
Figure 3C:
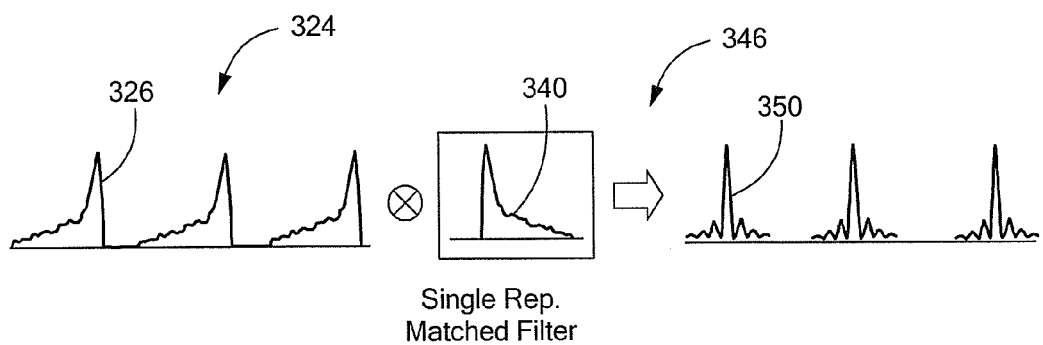
FIG. 3C is a diagram of example waveforms used in the flow diagram of FIG. 3B.

FIGS. 3A to 3C show LADAR receiver hardware 300a and processing performed at the LADAR receiver hardware 300a. At the input of the receiver hardware 300a, the return signal from the target is heterodyned using a heterodyne detector 502 (i.e., converted by mixing with a reference optical signal, the Local Oscillator, (e.g., an optical signal in the 200 THz region to the radio frequency (RF) region around 100 MHz current signal of the received signal)). The RF analog signal is digitized by an analog-to-digital converter, A/D, 306 creating a digital data stream, 308, that is stored in some buffer memory 310. The stored data is a digital representation of the analog LADAR return from a target, and is captured in the memory storage, where the digital processing begins for determining the ranged-resolved vibration image.

Since the signal transmitted by the LADAR sensor 102 is a coherent train of repeating subsignals, the digitized return signal 308 is a digital coherent train of repeating subsignals The first portion 300b of the digital process to compress the range data in the time domain using a matched filter 338 to the repeating pattern 326 of the waveform 324 stored as raw data 308 in the memory buffer 310. An example of the digitized return signal is a digitized return signal 324, which includes coherent subsignals 326.

The mixed signal from the mixer 332 is processed by a matched filter convolution 338. When a repetitive component is used to create a waveform, such as the train of coherent subsignals (e.g., a train of coherent pulses, a train of coherent chirps), a matched filter corresponds to the repeating component of the waveform. Such a configuration is referred to as subapertured ambiguity function like (SAFL). For example, the matched convolution filter 338 includes a matched signal of a single coherent subsignal, for example, a matched signal 340. The output of the matched convolution filter 338 is a train of compressed pulses or range compressed data 342 such as a signal 346 with compressed pulses 350.

The return from a target located at a single range resolution bin will generate a train of compressed pulses after the subapertured matched filter. The pulse spacing will be the same as the original transmitted pulse spacing. By sampling the received signal at the pulse spacing period, the signal from a given range bin is obtained. The number of different range bins that can be obtained is determined by dividing the pulse spacing (in range) by the resolution range, which is the pulsewidth time c/2. The pulse spacing determines the maximum range that is unambiguous. Returns beyond the pulse spacing would be misinterpreted as belonging to the second pulse after yielding a ambiguity that corresponds to this spacing. For example, if the pulse spacing is 10 microseconds and the resolution bins are 1 nanosecond wide, then 10,000 range bins can be obtained. Assuming that the return signal is from a heterodyne receiver, the train of pulses sample the beat frequency between the signal and the LO. Another advantage of this technique is that coherence of the target does not need to be known a priori. The pulse train can be indefinitely long, and each range bin can be sampled for a relatively long time. Various record lengths can be tried to optimize to whatever target induced loss of coherence may be. If the train of pulses is longer than the target coherence time, then the signal can be broken into components approximately as long as the coherence time, and then those components may be averaged in an incoherent way (e.g., using the magnitude only).

When using the LFM chirp, the matched filter of the repeating pattern process is referred to as the fast transform (e.g., a fast Fourier Transform) that will separate the return signal into range bins. After that separation, each single range bin is selected, and the signal is integrated for the coherent integration time, $T_{cit}$.

A matched filter in the LFM chirp can be implemented by multiplying the return by a chirp of the same slope (a process called de-chirping) followed by a Fourier Transform, which is applied to each chirp element. This generates a Fourier Transform spectrum where the frequency resolution corresponds to the range resolution given by (c/2)*(1/ BW) (where c is the speed of light). A specific range bin is selected, and all the samples that each chirp pulse generates are collected. If the chirp pulses are coherent to each other, then so will be the samples across a given range bin. The samples are collected for a period corresponding to the coherent integration time, $T_{cit}$, and a second Fourier Transform is performed on that data. This second transform is referred as the slow transform (e.g., slow Fourier transform) because it uses the data collected at a longer period of time. Typically, any motion compensation would be done on the data of the slow transform. The slow Fourier transform becomes one of the frequency slices used to create a spectrogram.

Since this process is done for each range bin, a spectrogram and a resulting vibration spectrum is formed for each range bin, hence the name range-resolved vibration.

Figure 4:
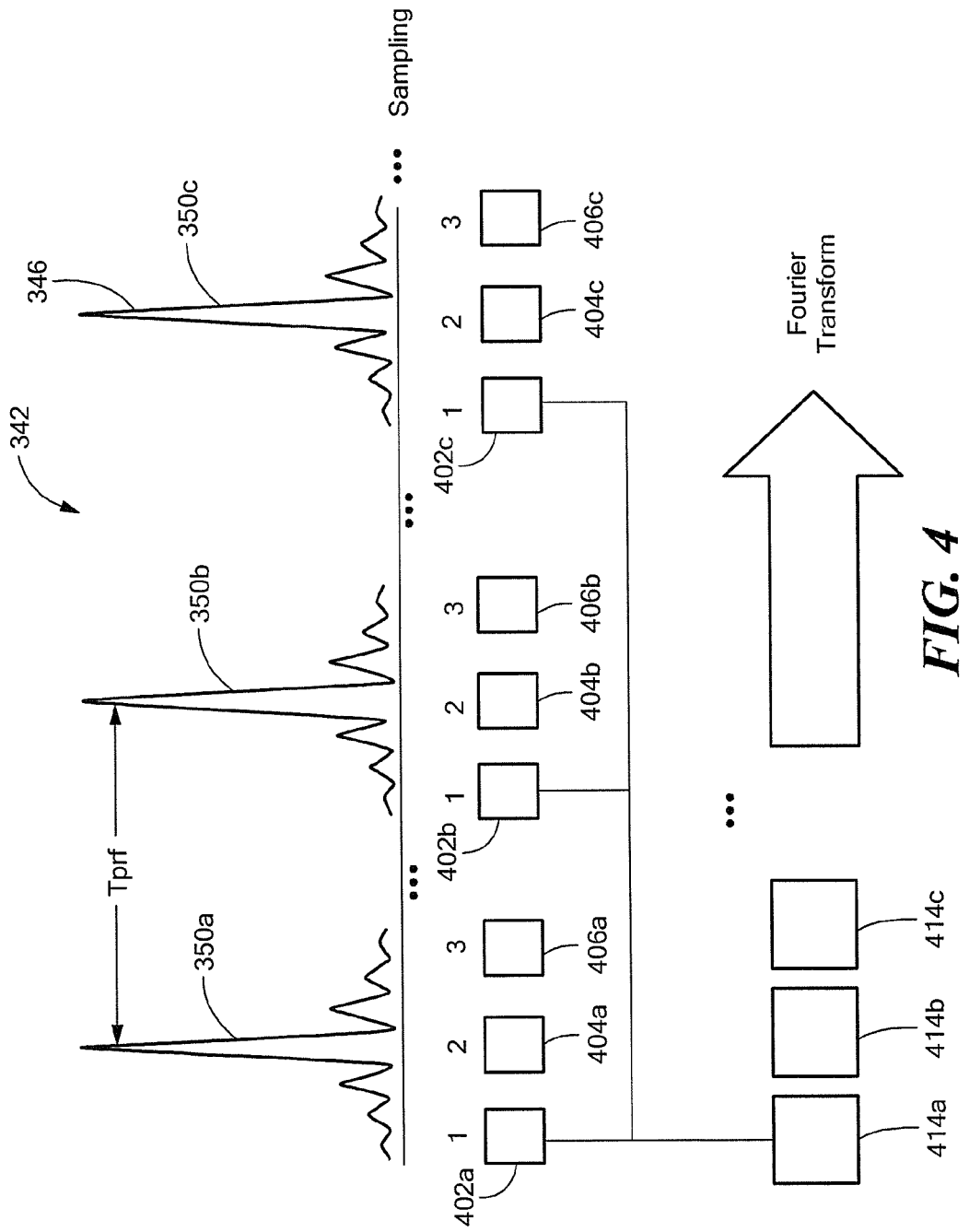
FIG. 4 is an example of the range compressed data as a train of compressed pulses.

Referring to FIG. 4, the compressed range data 342, for example, the train of compressed pulses 346, has a period of Tprf. The A/D sampling rate has a period of τ/2. The number of samples within the repeating pattern is n=2*Tprf/τ.

The train of compressed pulses 346 is used to form range bins. In particular, since the digital compressed pulses are coherent, like portions of a digital pulse are the same ranges. For example, data 402a at the beginning of a pulse 350a is the same range as data 402b at the beginning of a pulse 350b and is also the same range as data 402c at the beginning of the pulse 350c. In another example, data 404a in the middle of the pulse 350a is the same range as data 404b in the middle of the pulse 350b and is also the same range as data 404c at the beginning of the pulse 350c. In a further example, data 406a at the end of the pulse 350a is the same range as data 406b at the end of the pulse 350b and is also the same range as data 406c at the end of the pulse 350c.

The same range data is grouped together and a Fourier transform is formed on it. For example, data from 402a-402c, 404-404c and 406-406c are grouped together forming range groups 414a-414c. Each range group 414a-414c corresponds to return signals from that specific range sampled at a period of Tprf. A Fourier transform is then performed on each of the range group data.

Figure 5:
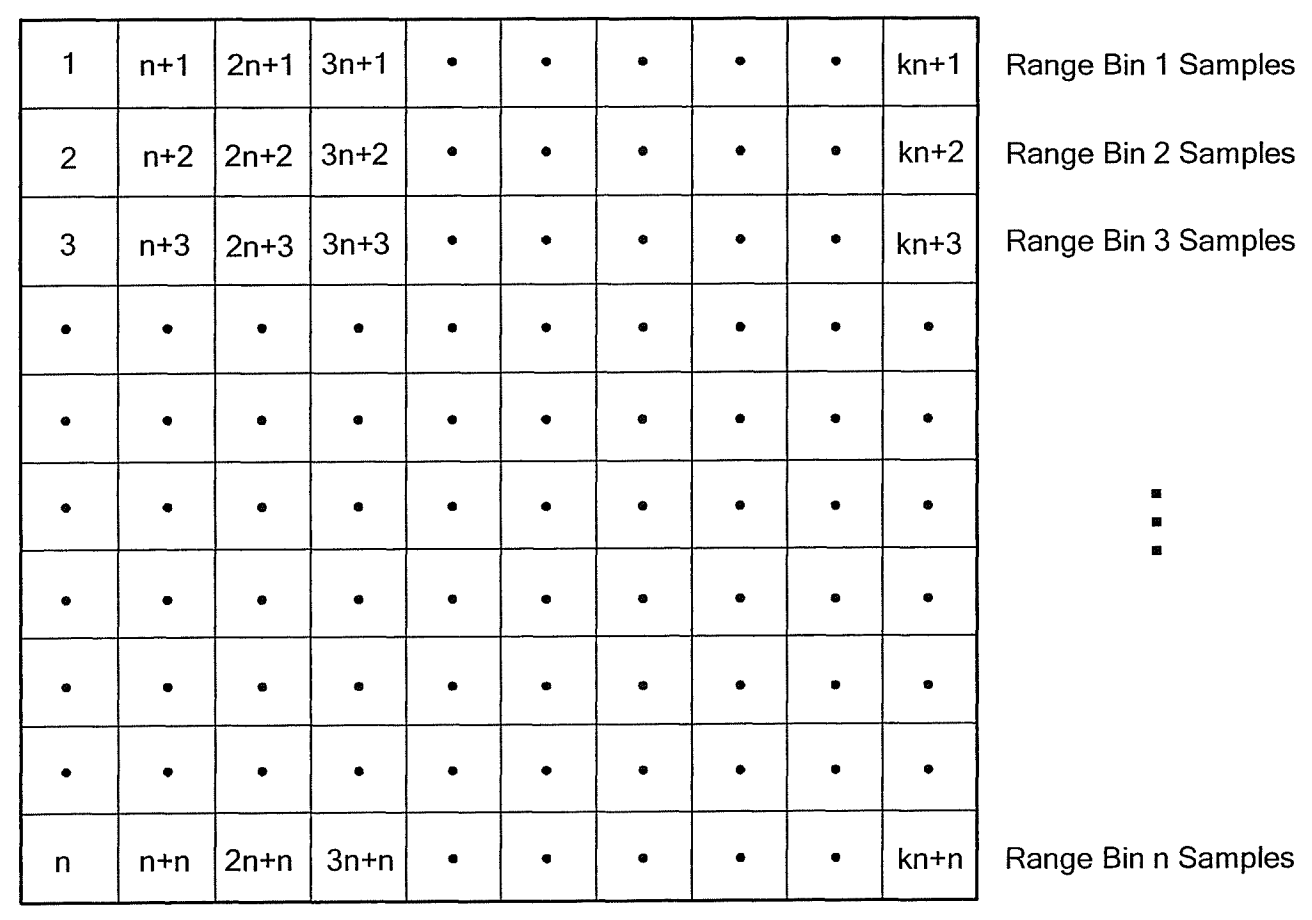

Referring to FIG. 5, the data between time, t=0 to Tprf, is organized into bins corresponding to the n samples of the train of compressed pulses 346. The resulting row corresponds to the returns for a single range-bin sampled at a period of Tprf. FIG. 5 is based on an assumption that the observation time is selected such that there are k samples at each range bin.

Figure 6A:
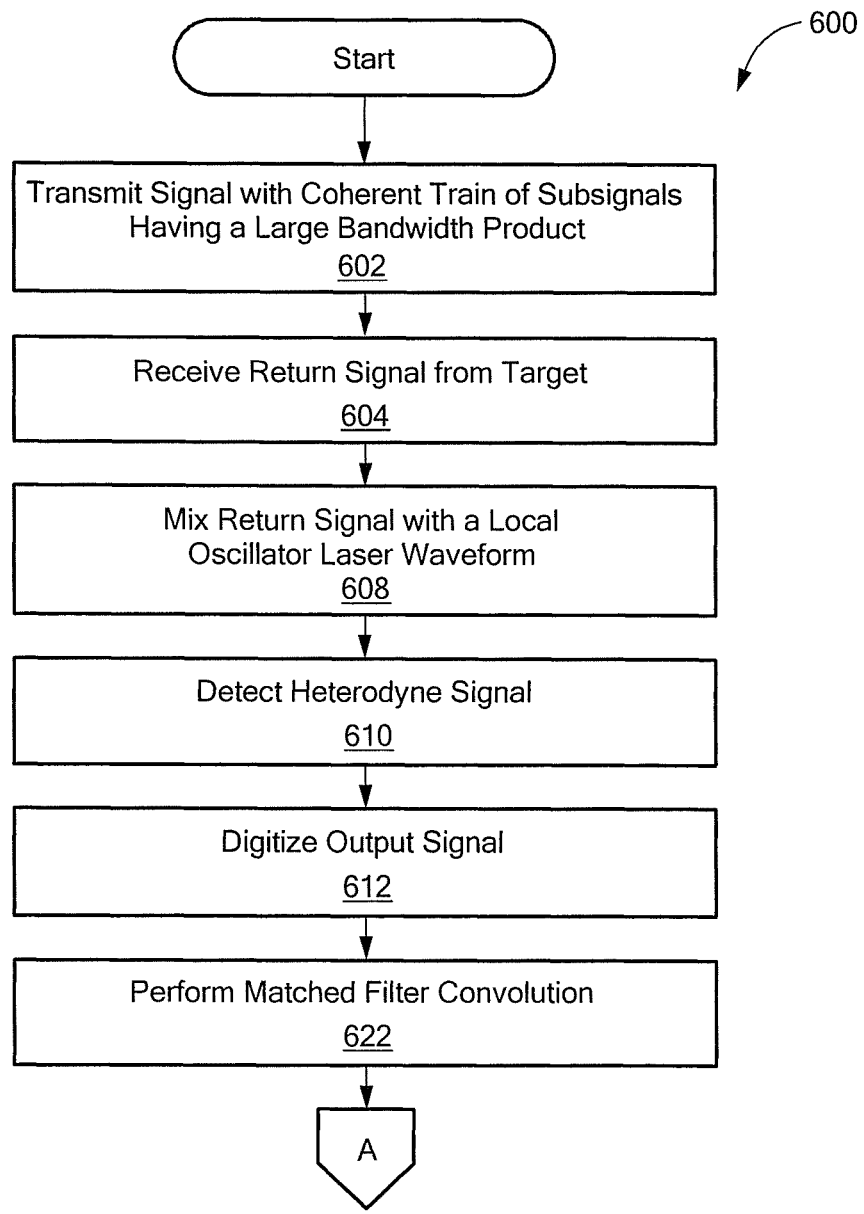
FIGS. 6A and 6B are a flowchart of an example of a process to determine range-resolved vibration.
Figure 6B:
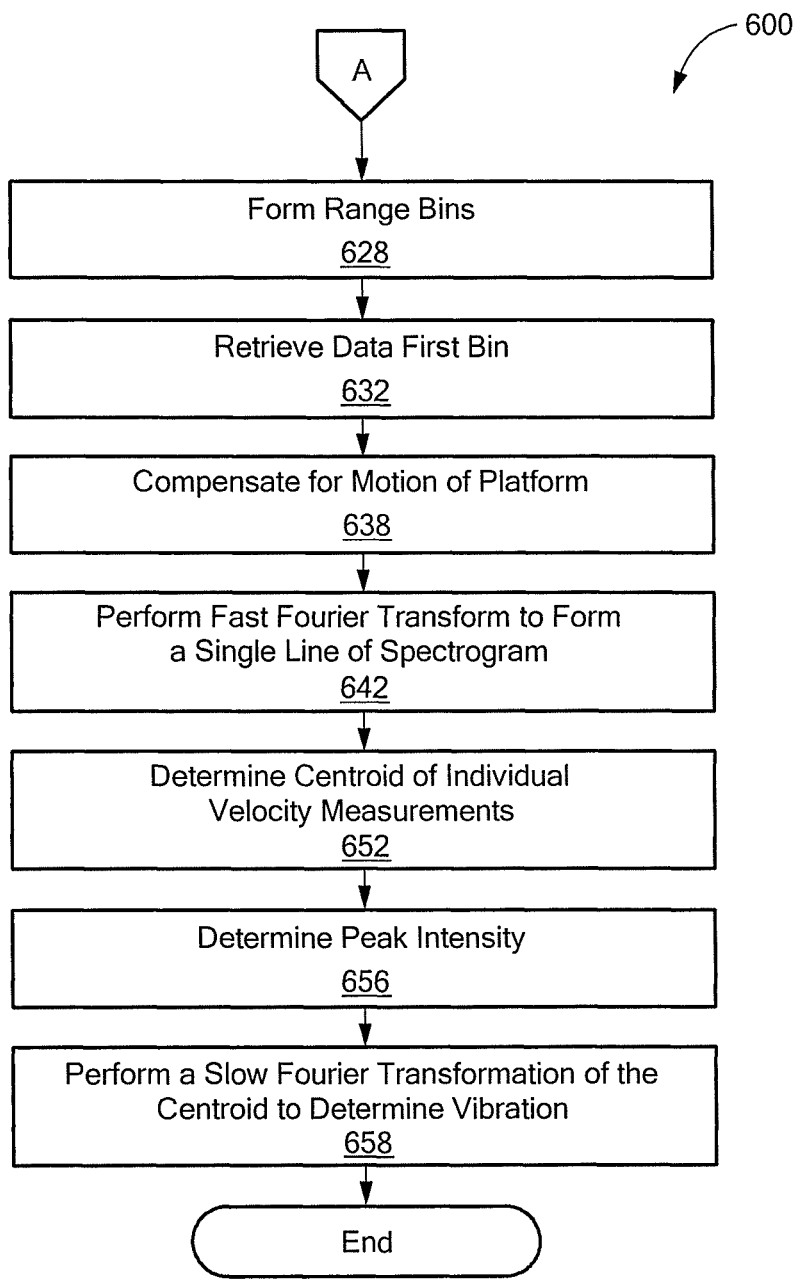

Referring to FIGS. 6A and 6B (also referred to herein collectively as FIG. 6), an example of a process to determine range-resolved vibration is a process 600. Process 600 transmits a signal with a coherent train of subsignals having a large bandwidth product (602). In one example, the LADAR sensor 102 transmits a coherent train of pulses. In another example, the LADAR sensor 102 transmits a coherent train of LFM chirps. The large bandwidth product, BT, is greater than 100.

Process 600 receives a return signal from the target (604). For example, the LADAR sensor 102 receives the return signal reflected off the target 104. Process 600 mixes the return signal with a Local Oscillator laser (608), detects a heterodyne signal (610) and digitizes the output signal (612). For example, the heterodyne detector 302 senses the return signal that is mixed with a LO laser waveform and the output of the heterodyne detector 302 is digitized by the A/D digitizer 306.

Process 600 performs a matched convolution (622). For example, the output of the A/D digitizer 306 is sent to the match filter convolution 338 to form range compressed data 342, for example, a range compressed coherent pulses.

Process 600 forms range bins (628) and retrieves data from a first bin (632). Process 600 compensates for the motion of a platform (638). For example, the phase and frequency of the heterodyne signal is adjusted to subtract the motion sensed (using other sensors) from the platform. In one example, the LADAR sensor 102 is disposed on the platform 106, which is moving.

Process 600 performs a Fourier transform of a coherent period of data, $T_{CIT}$, to form a single line (e.g., vertical) of a spectrogram (642).

Process 600 continues to add vertical lines to the spectrogram for as long as the pre-determined observation time. The length of the observation time determines the frequency resolution of the resulting vibration spectrum Once the spectrogram is complete, process 600 takes a centroid of individual velocity measurements (652) by determining the instantaneous Doppler frequency of the peak intensity of each vertical line that represents the instantaneous velocity at that point in time. Process 600 performs a slow Fourier transform of the centroid to determine a vibration (658).

Upon the completion of the process 600, a vibration and intensity is determined for each range.

Figure 7:
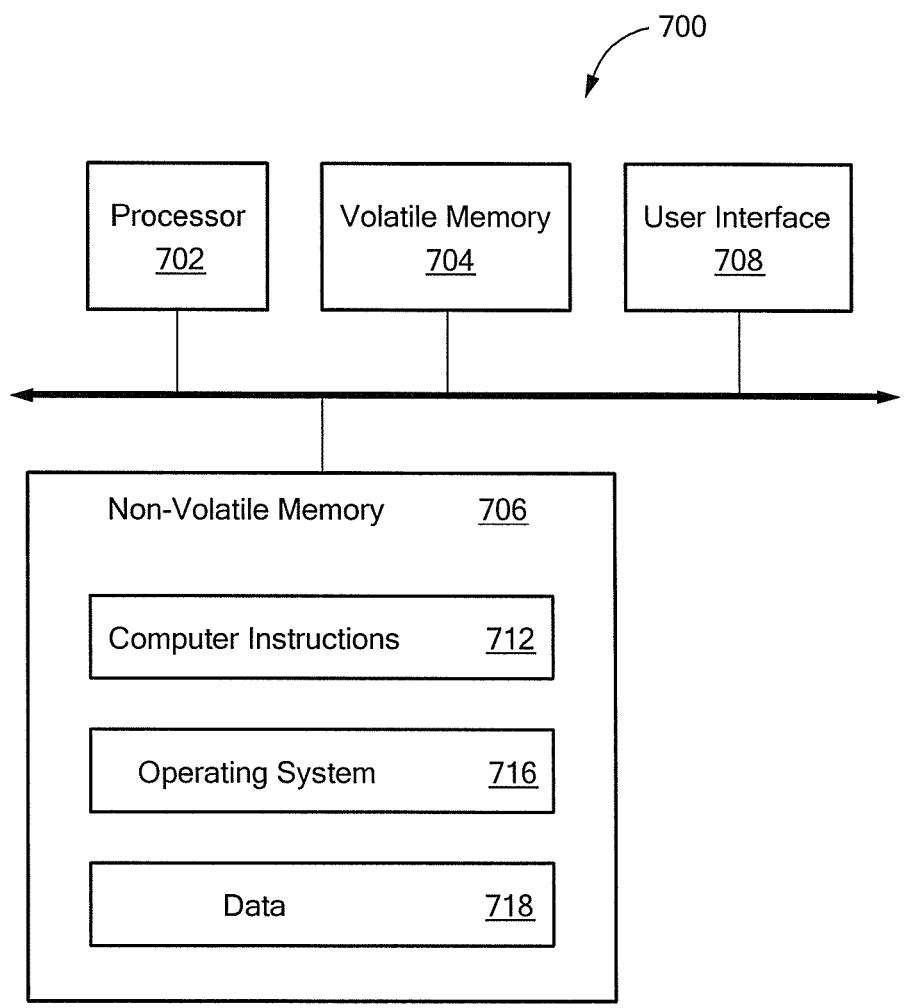
FIG. 7 is a computer on which the process of FIGS. 6A and 6B may be implemented.

Referring to FIG. 7, a computer 700 includes a processor 702, a volatile memory 704, a non-volatile memory 706 (e.g., hard disk), a user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704 to perform all or part of the process 600.

The processes described herein (e.g., the process 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 600 is not limited to the specific processing order of FIG. 6. Rather, any of the processing blocks of FIG. 6 may be re-ordered, combined or removed, performed in parallel or in serial, as necessary, to achieve the results set forth above.

The processing blocks in FIG. 6 associated with implementing the system may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
    forming range bins from range compressed data, the range compressed data comprising a train of coherent pulses formed from a return signal originating from a transmitted signal reflected from an object, the transmitted signal generated by a laser detection and ranging (LADAR) sensor, the train of coherent pulses having a large time-bandwidth product, the large time-bandwidth product being a product of coherent integration time times a bandwidth, the large time-bandwidth product being greater than 100;

for each range bin,
compensating for motion of the LADAR sensor;
performing a Fourier transform on the range compressed data;
determining a centroid of individual velocity measurements by determining an instantaneous Doppler frequency of a peak intensity of each vertical line that represents an instantaneous velocity at that point in time; and
performing a Fourier transform of the centroid to determine a vibration.

2. The method of claim 1, further comprising transmitting a signal to form the transmitted signal, the transmitted signal comprising a series of coherent subsignals.

3. The method of claim 2 wherein transmitting a signal to form the transmitted signal comprises transmitting one of a train of coherent pulses and a train of coherent chirps.

4. The method of claim 1, further comprising forming the range compressed data comprising:
mixing the return signal with a local oscillator laser; and
detecting the heterodyne signal using a heterodyne detector.

5. The method of claim 4, wherein foaming the range compressed data further comprises:
digitizing an output signal of the heterodyne detector; and
performing a matched filter convolution on the digitized output signal to form the range compressed data.

6. The method of claim 5 wherein performing the matched filter convolution comprises performing the matched filter convolution using a subapertured ambiguity function like (SAFL).

7. An article comprising:
a non-transitory machine-readable medium that stores executable instructions, the instructions causing a machine to:
form range bins from range compressed data, the range compressed data comprising a train of coherent pulses formed from a return signal originating from a transmitted signal reflected from an object, the transmitted signal generated by a laser detection and ranging (LADAR) sensor, the train of coherent pulses having a large time-bandwidth product, the large time-bandwidth product being a product of coherent integration time times a bandwidth, the large time-bandwidth product being greater than 100;
for each range bin,
compensate for motion of the LADAR sensor;
perform a Fourier transform on the range compressed data;
determine a centroid of individual velocity measurements by determining an instantaneous Doppler frequency of a peak intensity of each vertical line that represents an instantaneous velocity at that point in time; and
perform a Fourier transform of the centroid to determine a vibration.

8. The article of claim 7, further comprising instructions causing the machine to transmit a signal to form the transmitted signal, the transmitted signal comprising a series of coherent subsignals.

9. The article of claim 8 wherein the instructions causing the machine to transmit a signal to form the transmitted signal comprises transmitting one of a train of coherent pulses and a train of coherent chirps.

10. The article of claim 7, further comprising instructions causing the machine to form the range compressed data comprising instructions causing the machine to:
mix the return signal with a local oscillator laser; and
detect the heterodyne signal using a heterodyne detector.

11. The method of claim 10, wherein instructions causing the machine to form the range compressed data further comprises instructions causing the machine to:
digitize an output signal of the heterodyne detector; and
perform a matched filter convolution on the digitized output signal to form the range compressed data.

12. The method of claim 11 wherein the instructions causing the machine to perform the matched filter convolution comprises instructions causing the machine to perforin the matched filter convolution using a subapertured ambiguity function like (SAFL).

13. An apparatus, comprising:
circuitry to:
form range bins from range compressed data, the range compressed data comprising a train of coherent pulses formed from a return signal originating from a transmitted signal reflected from an object, the transmitted signal generated by a laser detection and ranging (LADAR) sensor, the train of coherent pulses having a large time-bandwidth product, the large time-bandwidth product being a product of coherent integration time times a bandwidth, the large time-bandwidth product being greater than 100;
for each range bin,
compensate for motion of the LADAR sensor;
perform a Fourier transform on the range compressed data;
determine a centroid of individual velocity measurements by determining an instantaneous Doppler frequency of a peak intensity of each vertical line that represents an instantaneous velocity at that point in time; and
perform a Fourier transform of the centroid to determine a vibration.

14. The apparatus of claim 13 wherein the circuitry comprises at least one of a processor, a memory, programmable logic and logic gates.

15. The apparatus of claim 13, further comprising circuitry to transmit a signal to form the transmitted signal, the transmitted signal comprising a series of coherent subsignals.

16. The apparatus of claim 15 wherein the circuitry to transmit a signal to form the transmitted signal comprises circuitry to transmit one of a train of coherent pulses and a train of coherent chirps.

17. The article of claim 13, further comprising instructions circuitry to form the range data comprising circuitry to:
mix the return signal with a local oscillator laser; and
detect the heterodyne signal using a heterodyne detector.

18. The article of claim 17, wherein instructions causing the machine to form the range compressed data further comprises circuitry to:
digitize an output signal of the heterodyne detector; and
perform a matched filter convolution on the digitized output signal to form the range compressed data.

19. The article of claim 18 wherein the circuitry to perform the matched filter convolution comprises instructions causing the machine to perform the matched filter convolution using a subapertured ambiguity function like (SAFL).

* * * * *